UNITED STATES PATENT OFFICE.

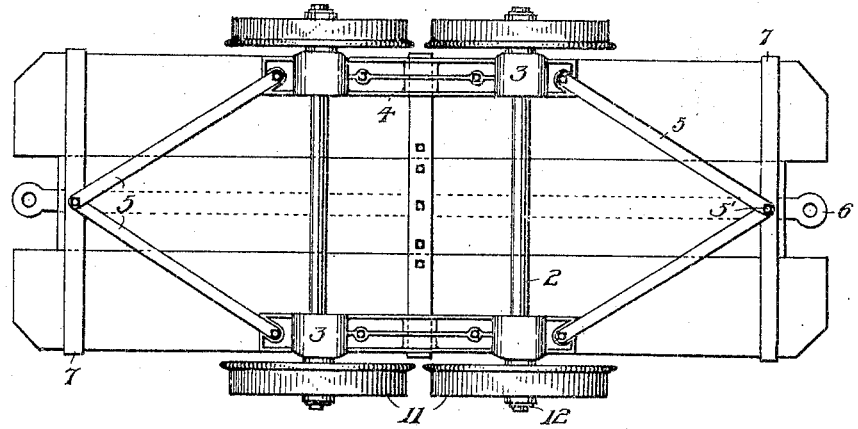
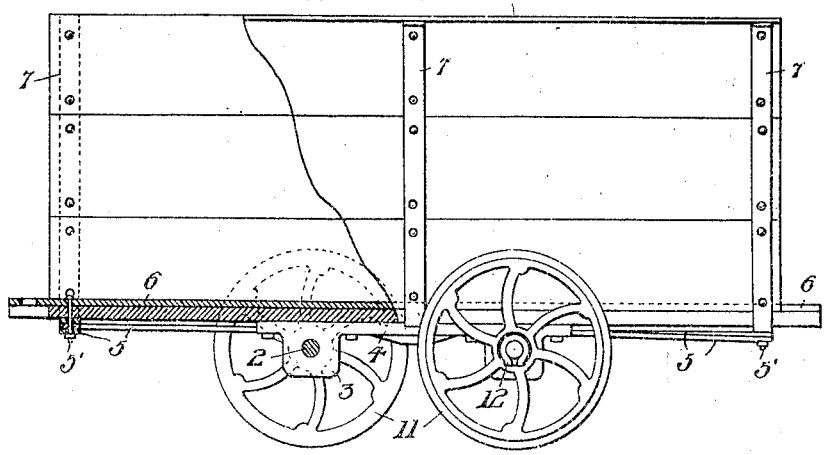
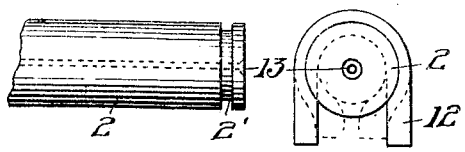

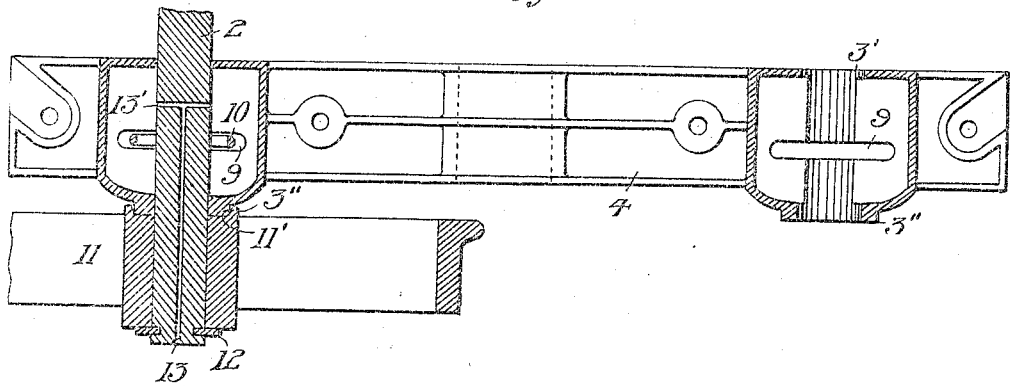
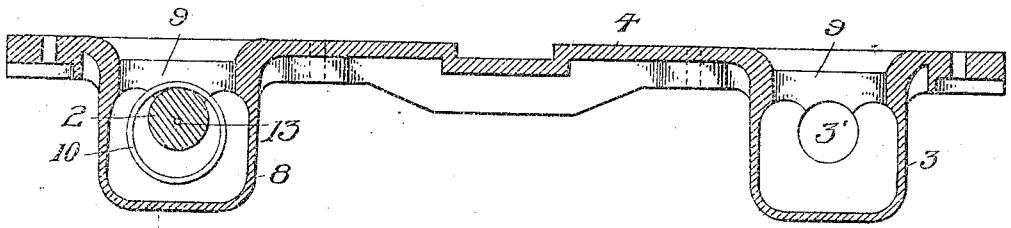
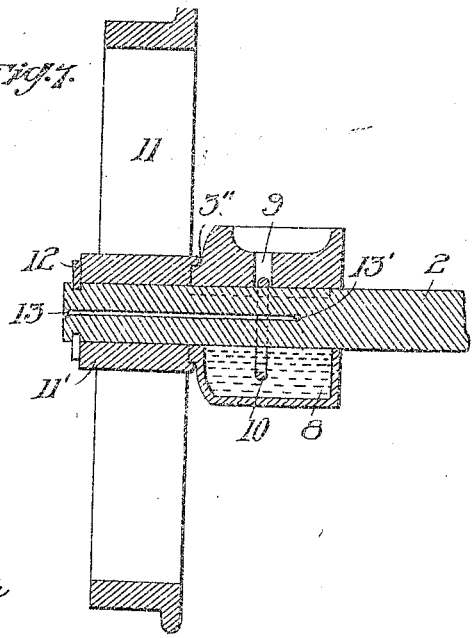

WILLIAM W. KEEFER, OF PITTSBURG, AND CHARLES E. WARD, OF BANKSVILLE, PENNSYLVANIA.

MINE-CAR.

No. 822,671.   Specification of Letters Patent.   Patented June 5, 1906.

Application filed November 23, 1905. Serial No. 288,676.

*To all whom it may concern:*

Be it known that we, WILLIAM W. KEEFER, residing at Pittsburg, and CHARLES E. WARD, residing at Banksville, in the county of Allegheny and State of Pennsylvania, citizens of the United States, have invented certain new and useful Improvements in Mine-Cars, of which the following is a specification, reference being had therein to the accompanying drawings.

One object of this invention is to provide improved self-oiling bearings which while designed primarily for the running-gear of a mine-car may be used in other connections or wherever such bearings are required.

A further object is to improve the general construction of mine-car running-gear and to provide for so securing and bracing the same to the car-body that the axles are held permanently and securely in proper position with relation to each other and to the body.

In the accompanying drawings, Figure 1 is a bottom plan view of a mine-car constructed in accordance with the invention. Fig. 2 is a side view thereof, partly in section. Fig. 3 is a detail view of a portion of one of the axles, and Fig. 4 is an end view of the same with the wheel-securing device applied thereto. Fig. 5 is an inverted plan view of one of the sills, shown partly in section, together with portions of the axle and one of the wheels. Fig. 6 is a side view of the same, partly in section. Fig. 7 is a longitudinal sectional view of a portion of the axle with the bearing therefor and one of the wheels.

Referring to the drawings, 2 designates the axles, and 3 the bearings in which the same rotate. The bearings for each side of the car are preferably formed or cast integral with and form part of the beam or sill 4, which extends longitudinally of the car-bottom. By this means the bearings are rigidly and permanently connected and cannot get out of alinement, a difficulty experienced with bearings which are separately secured and not rigidly and permanently connected. Sills 4 are bolted to opposite sides of the car-bottom, as shown, and in addition to being thus firmly secured they are braced at the ends by arms 5, which extend diagonally to the center of the car at its ends and secured by bolts 5' to the draw-bar 6, the latter extending longitudinally of the car from end to end. Bolts 5' also pass through end bands 7 to the car-body. The pull or strain on the draw-bar is thus transmitted directly to sills 4 and to the axles, the strain being equal on the two sills. With the sills rigidly braced and reinforced against distorting strains regardless of the direction from which such strains may come it is quite impossible for the axles and car-body to get out of proper relative position or for the running-gear to be impaired in any manner by the hard usage to which the car is subjected.

The axles are preferably of uniform diameter from end to end, so that with one or both wheels removed the axles may be readily mounted or dismounted by simply moving them longitudinally through the bearings without disturbing the bearings or removing a single bolt.

Formed in conjunction with each of bearings 3 is an oil-chamber 8, the curved top surface 8' of which forms the bearing proper. The bearing is slotted at 9 to admit and confine the lubricating-ring 10, which depends loosely from the axle into oil-chamber 8 and which is turned by the rotating axle in such manner as to carry the lubricant upwardly thereon.

Wheel 11 is adapted to rotate on the projecting end of journal or axle 2, the extremity of the latter having the circumferential groove 2' to receive the U-shaped securing-yoke or cotter 12, the latter being fastened by bending its extremities inward, as shown. Sufficient oil works outward along the axle from bearing-surface 3' to amply lubricate the wheel. The inner end of the hub is recessed at 11' to receive annular projection 3" on the bearing, thereby retarding the escape of oil at that point and also holding the axles against longitudinal movement. While it is preferable to have the wheels turn upon the axles, they may be shrunk thereon and turn therewith.

For introducing oil into the oil-chamber an oil-passage 13 extends inwardly through the extremity of the axle and opens laterally through opposite sides thereof, as indicated at 13', the inlet end of the oil-passage being preferably between oiling-ring 10 and the rear wall of the oil-chamber. It is thus unnecessary to provide the chamber with an oiling-opening, and the difficulties incident to closing such openings are avoided and all dirt is excluded. Furthermore, the oilingpoint being at the outer extremity of the axle it is always accessible. As it is usual to inject the oil by what is termed a "squirt-gun," there is no difficulty in forcing it through the comparatively small oil-passage, removing any matter temporarily clogging the same.

The invention dispenses with the oil-chambers commonly carried by self-oiling wheels and effects a material saving in oil without detracting from the efficiency of the lubrication.

Those features of the invention relating to lubrication devices not herein claimed are claimed in an application filed March 17, 1906, Serial No. 306,570.

We claim—

1. A car part or member consisting of a sill adapted to extend longitudinally of a car-body and formed with a plurality of transverse journal-bearings and with oil-chambers beneath the bearings.

2. A car part or member consisting of a sill formed with depending oil-chambers, each chamber being open to admit a journal, and a bearing-surface in the upper portion of each chamber.

3. A car part or member consisting of a sill formed with depending oil-chambers, each chamber being open laterally for the admission of a journal, and a bearing in the upper portion of each chamber, said bearing being disposed transversely of the sill.

4. A car part or member consisting of a sill formed with depending oil-chambers, each chamber having journal-openings at opposite sides and a bearing-surface between and in line with the openings.

5. A car part or member consisting of a sill formed with a depending oil-chamber open laterally for the admission of a journal, a bearing-surface in the upper portion of the chamber and disposed transversely of the sill, the sill having a ring-admitting slot opening downwardly through the bearing and into the chamber.

6. The combination of a car-body, a pair of sills extending longitudinally of the car at opposite sides, oil-chambers depending from the sills, axle-bearings in the upper portions of the chambers, and axles journaled in the bearings.

7. The combination of a car-body, a pair of sills extending longitudinally of the car at opposite sides, oil-chambers depending from the sills and having axle-openings in their side walls, bearing-surfaces in the upper portions of the chambers, and axles extending through the openings and upon which the bearing-surfaces rest.

8. The combination of a car-body, sills shorter than the body and extending longitudinally thereof and secured thereto, braces extending from the sills to the car ends, alining bearings carried by the opposite sills, axles journaled in the bearings, and wheels.

9. The combination of a car-body, a draw-bar extending longitudinally thereof, axle-mountings, and braces extending from said mountings to the draw-bar.

10. The combination of a car-body, sills extending longitudinally of the car at opposite sides thereof, axles mounted in the sills, a draw-bar extending longitudinally of the car, and braces extending from the sills to the draw-bar.

In testimony whereof we affix our signatures in presence of two witnesses.

WILLIAM W. KEEFER.
CHARLES E. WARD.

Witnesses:
JOHN YOUNG,
ALBERT C. ROHLAND.